CHARACTER RECOGNITION APPARATUS HAVING SIGNAL ENHANCING MEANS

Filed March 1, 1965

INVENTOR
FREDERICK J. SMYTH

INVENTOR.
FREDERICK J. SMYTH
BY

INVENTOR.
FREDERICK J. SMYTH

Jan. 21, 1969 F. J. SMYTH 3,423,730

CHARACTER RECOGNITION APPARATUS HAVING SIGNAL ENHANCING MEANS

Filed March 1, 1965 Sheet 4 of 4

INVENTOR.
FREDERICK J. SMYTH

United States Patent Office 3,423,730
Patented Jan. 21, 1969

3,423,730

CHARACTER RECOGNITION APPARATUS HAVING SIGNAL ENHANCING MEANS

Frederick J. Smyth, Binghamton, N.Y., assignor to Singer General Precision Inc., a corporation of Delaware Filed Mar. 1, 1965, Ser. No. 436,241
U.S. Cl. 340—146.3 13 Claims
Int. Cl. G06k 9/00

ABSTRACT OF THE DISCLOSURE

A character recognition apparatus is disclosed which includes a transducer having an output indicative of the shape of the character being sensed and a plurality of correlation networks each corresponding to a particular character. The correlation networks are responsive to the transducer output to provide an output therefrom, with the output of the correlation network corresponding to the character being sensed being of a lesser value than the outputs of the other correlation networks. The outputs of the correlation networks are connected to a comparison circuit which selects the output of lesser value. A plurality of null detector gates are responsive to the selected output and to the output of an associated correlation network to provide upon the occurrance of a difference between such outputs a large amplitude signal which is added to the outputs of each of the associated correlation networks. A utilization device is responsive only to the one modified output of the correlation devices.

*Disclosure*

This invention relates to a character recognition apparatus, and more particularly to an improved character recognition apparatus operable to more positively identify the character to be recognized than heretofore possible.

During the past several decades, large scale data processing machines have been installed in numerous business and industrial plants in order to more efficiently and economically maintain a real time record of such items as inventory, accounts, sales and the like. Recently, however, some of the expected advantages have not been fully realizable with these modern machines, as a result of the need for manually converting human intelligible language into the data format required by the machine.

For this reason, a number of character recognition apparatuses have been suggested in order to eliminate this intermediate and time-consuming step. In general, such apparatuses include an optical-to-electrical transducer to convert printed, or other readily distinguishable matter, as found on checks or other documents by way of example, into corresponding electrical signals, which are thereafter operated upon to provide information to a data processing machine or computer in the required data format. Further, since the input data to the transducer normally comprises a large number of symbols, characters, and other indicia, the character recognition apparatuses must also include evaluating, distinguishing, and/or identifying circuitry to ensure that only data corresponding to each character viewed by the transducer is delivered to the computer.

By far the largest group of character recognition apparatuses provide relative motion between the document and the transducer to thereby view each one of the symbols individually, either line-by-line, column-by-column, row-by-row, or in any other known sequence. The transducer output is next fed serially to a temporary storage device which may be a shift register, a tapped delay line, or a counter. After some, or all, of each character has been viewed by the transducer, the information is delivered in parallel to a number of correlation networks, one for each character to be identified, each correlation network also being effective to uniquely identify an individual character. At least one of the correlation networks then provides an output signal different from the output signals provided by the other correlation networks, and this different output signal is indicative of the character viewed, in accordance with the "best match" or "least difference" between the information supplied by the storage device and the data represented by the correlation networks.

As is well known, it has been difficult until now to reliably and accurately identify every character as a result of variations in print quality when the characters are printed in the conventional manner, or in the magnetization intensity when the characters are printed in magnetic ink. According to the present invention, however, there is provided an improved character recognition device which not only overcomes the above problems, but also positively identifies the character viewed in the presence of noise or other spurious signals. In a further embodiment of the invention, the apparatus is effective to identify a character even when the background noise is greater than the signal provided by the character to be identified.

Briefly, the apparatus of the invention includes a novel signal enhancer device which operates to modify the output signal of all correlation networks but one; the modified output signals being outside the range within which signals may be identified. This is accomplished by coupling the output of all the correlation networks in parallel to a comparison circuit which selects the greater or, as alternatively may be desired, the lesser, of the outputs. The selected output is then fed back as one input to a null detector gate associated with each correlation network, the output by the correlation network itself providing the second input to the null detector gate. The fed back signal will be different from the output of all the correlation networks except the one which provided the greatest signal to the comparison circuit. In this manner, all but one of the null detector gates remain open. Next, a large amplitude signal is applied to each of the null detector gates, the output therefrom adding to the amplitude of the correlation network output signal. Thus, all but the correlation network corresponding to the character viewed is effectively removed from the system. Since high gain may be included in the feedback loop, a high degree of amplitude selection is attained, all as hereinafter more particularly described.

It is an object of the invention, therefore, to provide a character recognition apparatus.

Another object of the invention is to provide an improved character recognition apparatus operable to more positively identify the character to be recognized.

Still another object of the invention is to provide an improved character recognition apparatus operable to positively identify the character viewed in the presence of noise or other spurious signals.

A further object of the invention is to provide an improved character recognition apparatus including a novel signal enhancer device.

Yet another object of the invention is to provide an improved character recognition apparatus including an optical-to-electrical transducer and a temporary storage device responsive thereto, the information from the storage device being delivered to a number of correlation networks in parallel, and a novel signal enhancer device coupled to all of the correlation networks to render the output provided by all but one of the correlation networks ineffective to identify a character.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 2:
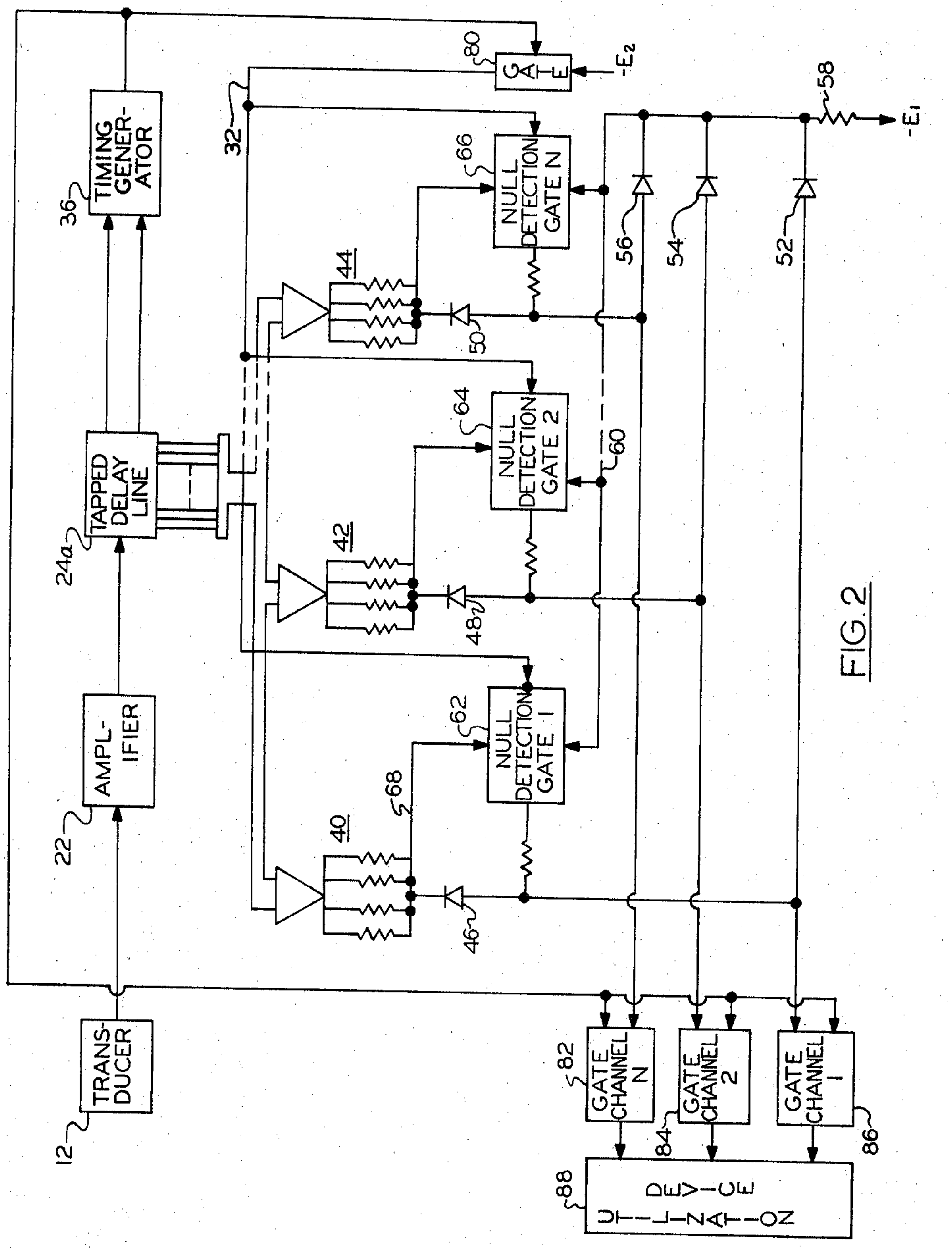
FIG. 2 is a block diagram of one embodiment of the invention, partly in schematic form, employing a tapped delay line.
Figure 2A:
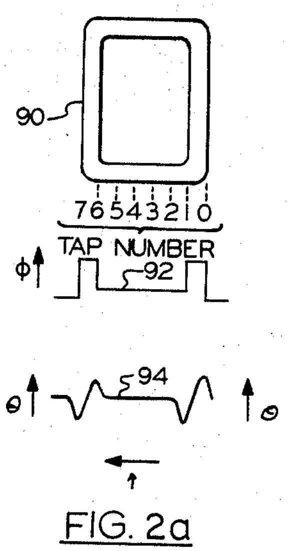

FIG. 2*a* illustrates waveforms useful in understanding the operation of the embodiment shown in FIG. 2.

Figure 3:
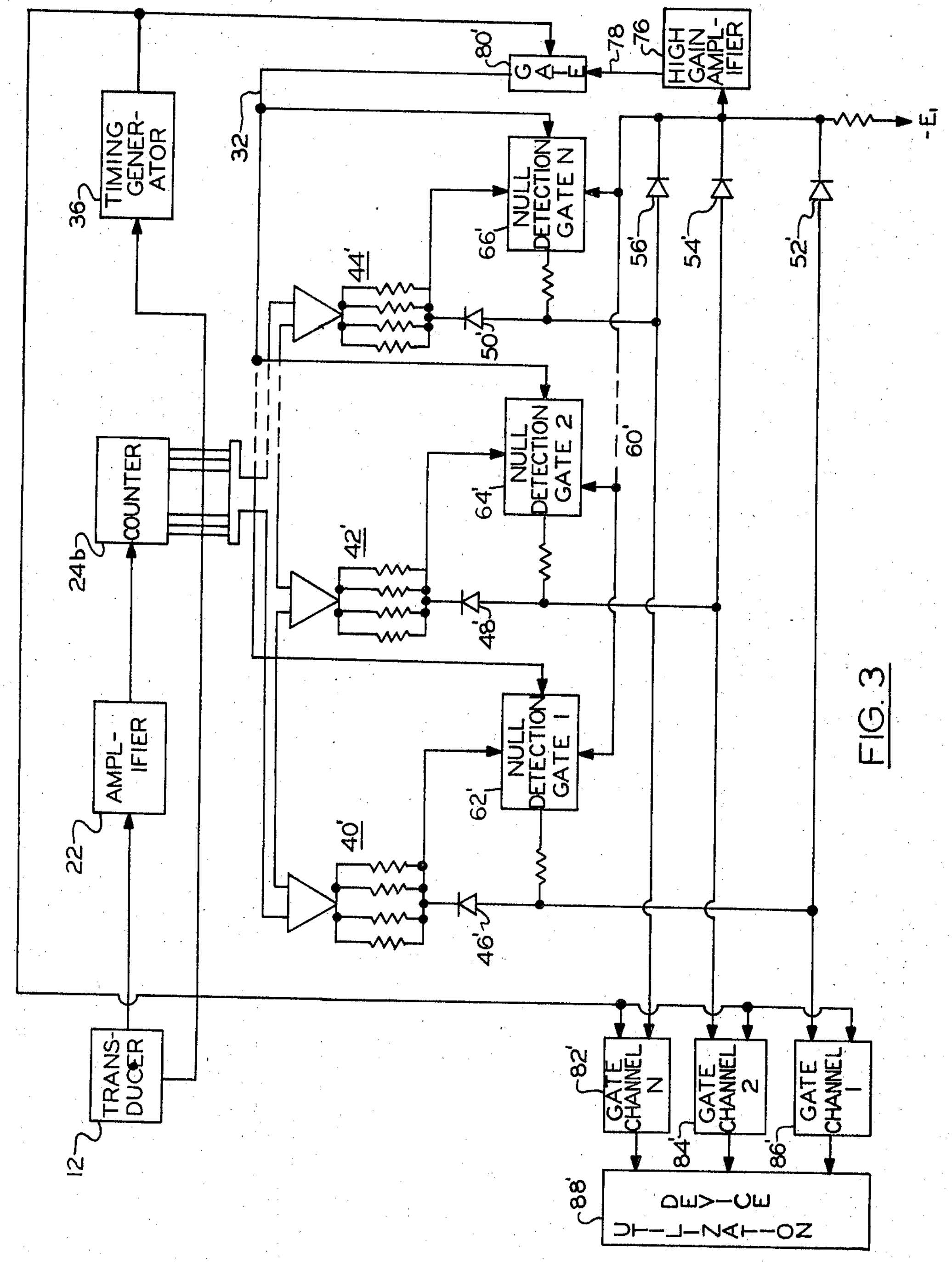

FIG. 3 is a block diagram of another embodiment of the invention, partly in schematic form, employment a binary counter.

Figure 3A:
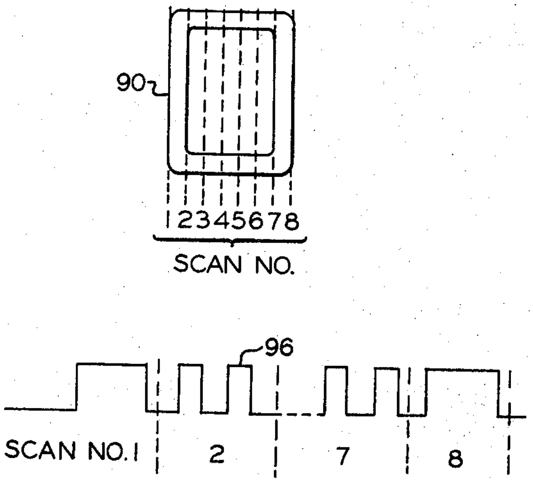

FIG. 3*a* illustrates waveforms useful in understanding the operation of the embodiment shown in FIG. 3.

Figure 1:
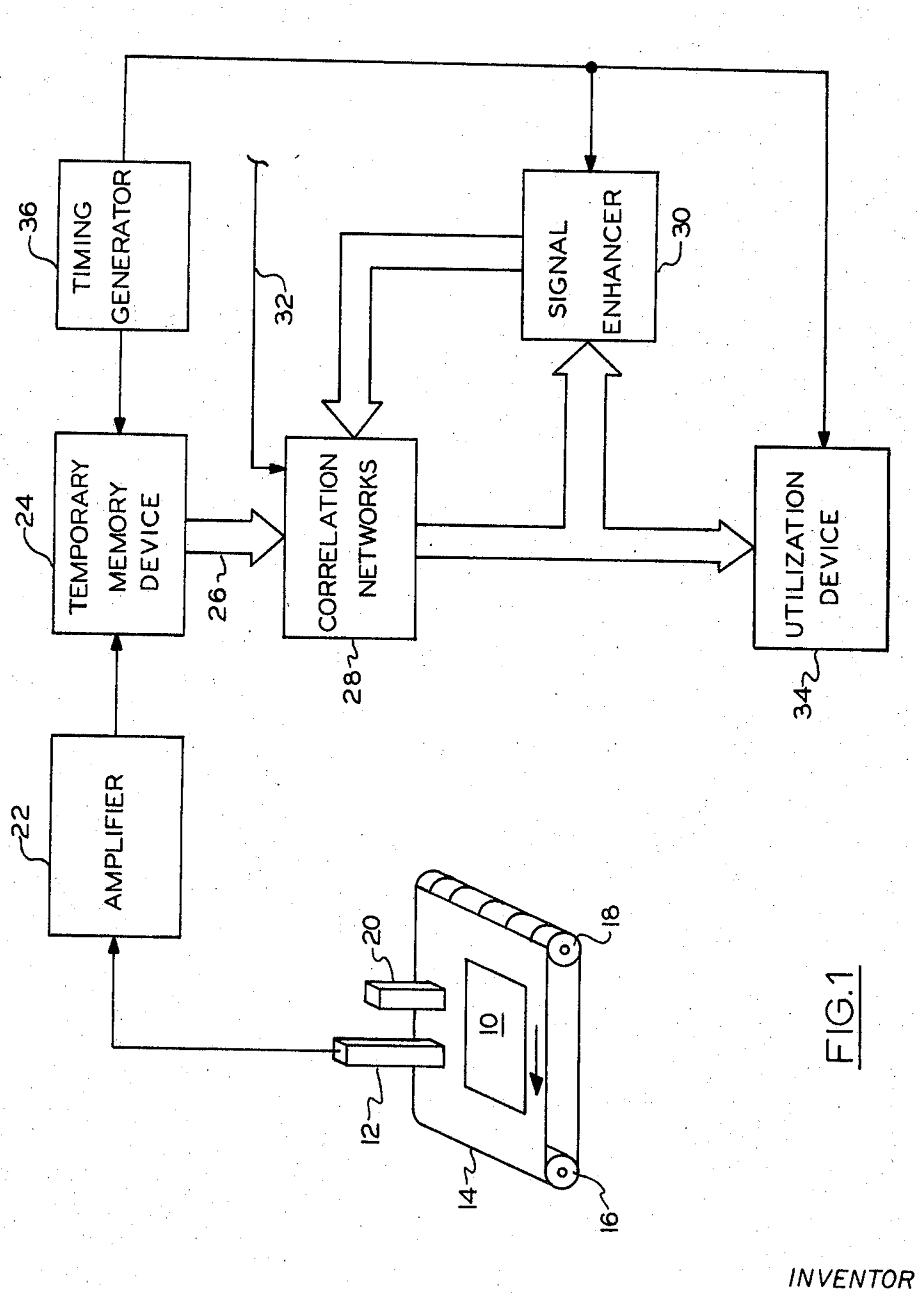
FIG. 1 is a block diagram of the character recognition apparatus of the invention.
Figure 4:
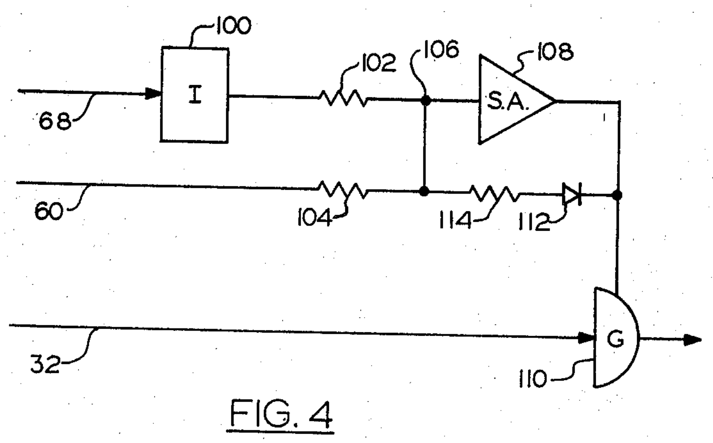

FIG. 4 is a schematic diagram of the signal enhancer shown in the block diagram of FIG. 1.

Referring now to the drawings, FIG. 1 illustrates a block diagram of the character recognition apparatus of the invention. As thereshown, a document 10 is provided with motion relative to the fixed position of an optical-to-electrical transducer 12, by means of a continuous belt 14 driven by rollers 16 and 18, other and different motion systems being substituted as desired. Although only a single degree of relative motion is indicated in FIG. 1, it will be understood by those skilled in the art, that when it is desired to view each of the character symbols line-by-line, column-by-column, etc., it is necessary to add a second degree of relative motion to the apparatus. This is generally accomplished by moving the effective viewing area of the optical-to-electrical transducer transversely to the direction of document motion. The movement of the effective viewing area of the transducer may be performed electronically by a flying spot scanner, a sequentially sampled column of photo transducers each of which views only a limited area of the document, or the like, as well as mechanically by a movable mirror and lens system. Further, when character symbols printed in magnetic ink are to be detected, transducer 12 is a conventional magnetic read head having associated therewith an electro-magnet 20, which operates uniformally magnetize the ink prior to the read operation.

Next, the output of the transducer, now comprising electrical signals representative of the characters viewed, or scanned, is delivered to amplifier 22. Since the frequency range of the signals provided by transducer 12 occupy only a limited frequency band, which is, of course, determined by such variables in each installation as the document speed, the speed at which the effective viewing area of the transducer transverses each column, as well as by the symbol size, it is preferable, although not necessary, that amplifier 22 exhibit a band pass response, in order to eliminate noise generated in those portions of the frequency spectrum which are normally not occupied by the major frequency components of the transducer signals. The output of amplifier 22 is coupled to a temporary memory device 24, which is operable to accept serial information from the amplifier, and to thereafter selectively provide readout of this information in parallel form along a number of lines inidated generally as 26. Storage device 24 may be a shift register, a tapped delay line, a counter, or any device which accepts and stores input serial information, and thereafter provides parallel output information representative of the serial input information.

Continuing, lines 26 are separately interconnected to a number of correlation networks, one for each symbol to be recognized, indicated as block 28. Each of the correlation networks defines a character channel, and are so connected to some, or all, of lines 26, that one correlation network provides an output signal lever which is greater, or lesser, in absolute magnitude than the output signal levels provided by any of the correlation networks in the remaining character channels. It should be understood that because of the large number of symbols to be recognized as well as the limited range of signal levels available, it has been difficult until now to positively recognize an individual character when the signal amplitudes derived therefrom by the individual correlation networks differ by only a minute amount. By means of signal enhancer device 30, by way of example, these minute differences are magnified to such an extent that the outputs of all the correlation networks, except that responsive to the character viewed by transducer 12. are modified to differ drastically from the output signal level provided by the correct character channel.

As will be better understood as this description proceeds, signal enhancer 30 operates to compare all of the output signals from the individual correlation networks, and to select only that output signal which has the greatest absolute magnitude (or the least absolute magnitude if desired), and then delivers this selected output signal as a first input signal to each of the null detector gate circuits associated with the correlation networks included in each character channel. Since a second input signal applied to each null detector gate circuit is provided by each correlation network itself, it should be understood that only one of all the null detector gate circuits will have applied thereto signals of equal amplitude, and thus anly one of the null detector gate circuits will be closed. All of the other null detectors will remain open, and operate to transfer a large amplitude signal provided by a line 32 to, and in addition to, the output signal provided by the correlation networks. In this manner, the output signal of all the correlation networks but one is rendered inoperative to further be effective to either evaluate, distinguish, identify or recognize a character symbol. However, the outputs at all the correlation networks, both as modified and the one unmodified output signal is then applied to a utilization device 34, which is effective to provide the proper data format to the associated computer or data processing machine, representative of the particular character symbol viewed.

Because the null detection circuits forming a part of signal enhancer 30 may be designed to be effective to distinguish between applied signal levels differing by as little as a few millivolts or less, the automatic selection of the correlation network corresponding to the character being viewed or scanned may be made extremely positive. Additionally, should noise or other spurious signals be present on parallel output lines 26 from temporary storage device 24, these may be readily filtered out by conventional techniques in order to reduce any tendency of the apparatus to "misread" a character. This results from the fact the present invention requires only a relative difference between the various correlation signals rather than an absolute difference such as has been required by the devices of the prior art. Further, since the relative least difference is being detected, it is essentially immaterial if the correlation signol provided by the correlation network corresponding to the character being viewed supplies an amplitude level of −1, −1½, or −2 volts as a result of variations in print quality, magnetization intensity, etc., for the reason that each of these effects will operate to likewise increase the amplitude level of the signals supplied by all the other correlation networks leaving the relative difference unchanged, and it will be seen that the correct character is still identifiable. Therefore, rather than depending upon the absolute levels of the signals in order to obtain correct character recognition, the apparatus of the invention is responsive to "floating signal levels."

Referring now to FIG. 2, there is illustrated a specific block diagram of one embodiment of the invention, partly in schematic form, employing a tapped delay line. For the purpose of explanation only, this embodiment will be described as a magnetic ink character reader, it being understood that the embodiment may readily be adapted to read and recognize printed or other types of encoded indicia. As shown, a transducer 12, which generally is a magnetic read head, is employed to convert magnetically imprinted symbols into an electrical waveform corresponing thereto. Further as discussed above, a magnet 20, either of the electrical or permanent type, may be employed to ensure that the magnetically imprinted symbols are of uniform magnetic intensity prior to being viewed by transducer 12. The electrical waveform provided by transducer 12 is then amplified by amplifier 22 and delivered to the input of temporary storage device, which in the embodiment now being described, consists of a multi-tapped delay line 24*a*. As shown in FIG. 2, a first pair of output lines are coupled between delay line 24*a* and timing generator 36. Briefly, as the leading edge of the waveform arrives at the highest order tap position, the tap numbers increasing from right to left, a portion of this leading edge is coupled to timing generator 36 along one of the first pair of output lines to provide a reset signal to the timing generator, which is then effective to close all of the various gates shown in FIG. 2. Next, when the leading edge of this waveform arrives at the lower order tap position, a portion of this leading edge is coupled to the timing generator along the other of the first pair of output leads from line 24*a* to provide a set signal, timing generator 36 then being effective to open the gates and initiate a recognition operation, all as more particularly hereinafter described, it being understood that the delay of line 24*a* is sufficient to provide for the temporary storage of all, or a predetermined portion, of the widest character to be recognized.

For reasons of clarity, the output taps from delay line 24*a* are shown as a common cable coupled to the input of correlation networks 40, 42, and 44 in parallel. In reality, of course, only certain combinations of the tap positions are applied to any one correlation network, the number and the particular tap positions being determined both by the number of character symbols to be recognized and the specific design of the correlation networks. Referring now to FIG. 2*a*, there is shown, by way of example, the symbol O, indicated as 90, it being understood that the following analysis is applicable to all other alphanumeric symbols as well as special characters. Immediately below symbol 90, there is depicted a plot, 92, of the magnetization intensity $\phi$ viewed by transducer 12, as symbol 90 moves relatively from left to right with respect thereto. It will be seen that the vertical portion of symbol 90 provides a greater magnetization intensity than that provided by the connecting horizontal portions of the character O as drawn in FIG. 2*a*. The electrical waveform provided by transducer 12 upon viewing waveform 92 is illustrated by $\theta$ waveform 94, and corresponds essentially to the differential of the magnetization intensity illustrated in plot 92. As this waveform, amplified by amplifier 22 travels along delay line 24*a*, it will be seen that each of the taps of the delay line are subjected to a pair of first positively increasing potentials followed thereafter by adjacent negatively going potentials. It should further be noted that since the magnetization intensity encountered by transducer 12 between the vertical portions of character 90 are essentially constant, waveform 94 provides a reference level during the time interval this portion of the waveform is adjacent any of the taps of line 24*a*, in accordance with the well known rules of differentiation. Further, waveform 94, as shown, is temporarily stored in delay line 24*a* when a character recognition cycle commences upon the positive leading edge of the waveform 94 arriving at the lowest order tap position, tap 0, through the energization of the other of the first pair of output leads coupled between the delay line 24*a* and timing generator 36 as briefly outlined above. An examination of waveform 94 during the time interval that this waveform is stored within delay line 24*a* is sufficient to show that the waveform attains its most positive amplitude level excursions adjacent taps 0 and 6 of multi-tapped delay line 24*a*, and the minimum amplitude levels adjacent taps 1 and 7. Although only eight taps as necessary are shown in FIG.

2*a* it will be understood that as many taps may be selected. All of the remaining taps of line 24*a* sense only an essentially constant reference level which may be either ground potential or another specific reference potential as required by each particular installation.

In any event, by combining the output amplitude levels available at one or more selected tap locations and coupling these amplitude levels to the weighted resistors forming correlation networks 40, 42, and 44, it will be seen that only the correlation network which corresponds to the character being viewed will provide an extreme output signal, which in the present embodiment is a negative voltage of minimum absolute magnitude, although positive or negative voltages of either maximum or minimum absolute magnitude may be substituted as desired. For example, by applying the voltage provided by taps 1 and 6 to the correlation network representative of the numeral 0, a minimum negative voltage will be obtained which is less than all the other correlation networks coupled to one of taps 1 and 7 and not coupled to either of taps 0 and 6. It should now be seen that by properly selecting appropriate taps to be combined by the weighted resistors forming a part of correlation networks 40, 42, and 44 a unique minimum voltage may be provided by only one of the correlation networks. In those installations wherein only the ten numerical digits are to be recognized, the number of taps required from delay line 24*a* may be minimized, and additionally the design of the several correlation networks may be relatively simple. Further, the invention also contemplates the summation of portions of the positive excursions of waveform 94 with portions of the negative excursions thereof when the number of symbols to be recognized is increased over the ten numerical digits. It is further contemplated by the invention, when the size of the vocabulary increases, to include not only the ten numerical digits, but also the 26 alphabetical symbols and five, ten, or more special symbols, that the output signal amplitude levels may be fed in parallel through a corresponding number of inverting amplifiers to provide an equal number of signals of polarity opposite to that sensed by the various taps of line 24*a*. In this manner additional combinations of tap positions either standard or of reversed polarity may be coupled to the several correlation networks in order to properly recognize the character viewed. Alternatively, a dual polarity delay line may be substituted for delay line 24*a* to provide simultaneously signal amplitude levels at a first series of tap positions and inverted polarity of signal amplitude levels at a second series of tap positions, each of the latter corresponding to a particular tap position of the first series. However, since this first embodiment is primarily concerned only with recognizing figures imprinted on a check or the like with magnetic ink, these figures are generally formed in accordance with the standards defined by the American Bankers Association and designated as E13/B characters which results in that only a conventional multi-tapped delay line and relatively simple correlation networks are necessary to properly recognize a character. Additionally, the design of more complex correlation networks may be found in U.S. Patent 3,103,646 which issued Sept. 10, 1963, by way of example.

Referring again now to FIG. 2, it will be seen that the various voltage levels provided by correlation networks 40, 42, and 44 are applied both to each of isolation diodes 46, 48, and 50 as well as to a first control input of associated null detection gates 62, 64, and 66. Through proper design of the selected ones of the tap positions of delay line 24*a*, and the value of the weighted resistors within each one of the correlation networks, only one correlation network will deliver an output voltage which is less in absolute magnitude than the output voltage provided by any of the other correlation networks. Continuing, the output signals coupled through isolation diodes 46, 48 and 50 are individually fed to the anodes of a further group of diodes 52, 54, and 56, the cathodes of which are returned to a negative potential, $E_1$, through a common load resistor 58. In this manner it will be seen that the cathodes of diodes 52, 54, and 56 are clamped to a negative potential of minimum absolute magnitude, since this potential is the most positive potential provided by the several correlation networks and also corresponds to the character viewed by transducer 12. This selected voltage level is fed in parallel along a line 60 to a second control input of each of null detection gates 62, 64, and 66, the first control input signal being provided by the output of the associated correlation network 40, 42, and 44 respectively, as discussed above. As more particularly described in detail hereafter, each of the null detection gates is effective to pass the voltage coupled to its input signal terminal directly to the output signal terminal when the voltage amplitude levels applied to both control input terminals differ, the difference being in the millivolt range or less. Conversely, when the voltage levels applied to both of the control input terminals are equal, the null detection gate will remain closed thereby isolating the input signal terminal from the output signal terminal.

The output of timing generator 36 is applied to the control input of gate 80 which includes an input terminal coupled to a source of negative potential, $-E_2$, $E_2$ having an absolute magnitude greater than the magnitude of any output signal level that may be provided by the correlation networks. Thus, when the leading edge of the waveform corresponding to the character scanned operates to set timing generator 36 to the ON state as described above, gate 80 is opened, and its output terminal applys potential $-E_2$ to the input signal terminal of all of the null detection gates. At this time, only one of the null detection gates remains closed as a result of the control signals applied thereto being of equal amplitude. By way of example should correlation network 40 provide an output signal of minimum absolute amplitude, the negative signal level is coupled through isolation diode 46 and diode 52 to cause the upper terminal of resistor 58 to be clamped at this level. As shown in FIG. 2, this minimum signal level is applied directly along a line 68 to the first control input of null detection gate 1, identified by reference numeral 62 as well as to the second control input of gate 62 by means of line 60. Since these two control signals are equal, gate 62 remains closed. However, since the signal level provided by all of the other correlation networks exceeds, in absolute magnitude, the signal level provided by correlation network 40 in the present example, the remaining null detection gates 64 and 66 are open. In this manner the large negative voltage, $-E_2$, passed by gate 80 is delivered along line 32 to and through the open null detection gates and added to the normal output of all of the correlation networks which do not correspond to the character being viewed.

The reason for isolation diodes such as 46, 48, and 50 should now be obvious. It will be seen that the potential $-E_2$ is applied to the anode of the isolation diodes, thereby reverse biasing all but one of these diodes in order to prevent the possibility of back circuits which might operate to couple potential $-E_2$ to the correct character channel through a common one of the taps of delay line *24a*. The invention further contemplates the substitution of buffer amplifiers in lieu of the isolation diodes if desired. It should be noted that the null detection gates 62, 64, and 66 are an extremely important feature of signal enhancer 30 (see FIG. 1) of the invention since the magnitude of the output of all correlation networks but one is drastically modified to remove the signals provided thereby from the range of amplitude levels normally supplied by the correlation networks, thereby greatly simplifying the following recognition circuitry.

The output signals from each of the correlation networks, both unmodified and as modified by potential $-E_2$, are further coupled to individual character channel gates 82, 84, and 86, the conduction state of which are also under control of timing generator 36, and at this time with generator 36 being set to the ON state, are each effective to connect the input and output terminals together. The output of the channel gates are next coupled in parallel to a utilization device 88. Device 88 may be any recognition apparatus as well known in the prior art or more simply may include merely amplitude selection means operable to block the signals having a potential substantially equal to $-E_2$, yet accepting signals within the normal range of signals provided by any of the correlation networks. The one character channel signal level accepted is thereafter operative to generate a binary or digital code identifying the character or symbol viewed in the proper data format for use by the data processing machine or digital computer employed. Since utilization device 88 forms no part of the present invention, it need not be further described, reference being made to any of the standard character recognition manuals as required. In this manner an automatic character recognition apparatus is provided which functions to convert magnetic imprinted symbols into machine intelligible language while markedly reducing the possibility of introducing errors or "misread" signals through the novel signal feedback means as above described. Further although only three character channels, identified as 1, 2, and N are illustrated in FIG. 2 for reasons of clarity, it should be understood that as many character channels as there are characters to be recognized are generally employed in a fully operative character recognition apparatus according to the invention.

Referring now to FIG. 3, there is illustrated a specific block diagram of another embodiment of the invention, partly in schematic form, employing a counter as a temporary storage device. Again for the purpose of explanation only, this embodiment will be described as a conventional printed symbol character reader, it being understood that this embodiment may readily be adapted to read magnetically imprinted symbols or other types of encoded indicia. Additionally, since the embodiment illustrated in FIG. 3 includes many of the same components as those shown in FIG. 2, the same reference numerals are attached thereto as applicable, minor differences of these similar components being indicated by the addition of primes. As shown, a transducer 12 scans the character on document 10 to be recognized. In this particular embodiment, the transducer may be a cathode-ray-tube in combination with a photo detector such as shown and described in copending application Ser. No. 336,080, filed Feb. 10, 1953, or alternatively, an array of photo-diodes such as taught in copending application Ser. No. 149,144, filed Oct. 17, 1961, each of such applications being assigned to the assignee of the present invention, it being understood that other and different optical-to-electrical transducers may be substituted as desired. Assuming now for purposes of explanation that only a single photo detector is employed, it should be understood that an electrical signal is provided by the photo detector which is an electrical waveform serially representative of the symbol scanned by the associated cathode-ray-tube. This resultant electrical waveform is then amplified by band-pass amplifier 22 and fed to the input terminal of a temporary storage device, which in the embodiment now being described, is indicated as counter *24b*. Counter *24b* is generally selected from the group of binary counters which includes a number of serially connected multivibrator or flip-flop stages. As well known, each flip-flop stage operates as a bistable storage device wherein in response to the application of a trigger pulse signal operates to switch from a first stable state to a second stable state. In response to the application of the next succeeding trigger pulse signal, the flip-flop stage switches from the second stable state back again to the first stable state, the resetting of the first stage being effective to provide a trigger pulse signal for the next succeeding flip-flop stage. A typical binary counter is shown and described at page 194 of the volume entitled Arithmetic Operations in Digital Computers, by R. K. Richards, published in 1955 by D. Van Nostrand, Inc.

It should also be noted that, in the embodiment of the invention illustrated in FIG. 3, the required sweep circuits for the beam deflected cathode-ray-tube of transducer 12, which may be generated in a manner similar to that shown in the hereinabove referenced copending application Ser. No. 336,080, further operate to set and reset timing generator 36. That is, at the termination of the required number of horizontal or vertical sweep scans, depending on the relative direction of movement of document 10 with respect to transducer 12, the resetting of the particular sweep waveform defining the symbol area is coupled to timing generator 36 to set the timing generator to the set state, thereby opening the various gates shown in FIG. 3. It may be seen that, at this time all of the symbol intercepts resulting from the character scan operation have been stored in counter 24*b*. It will be recognized that as the beam provided by the cathode-ray-tube intercepts a transition of the light reflectivity provided by document 10 to the light reflectivity provided by a character, the magnitude of the output waveform generated by the associated photodetector correspondingly changes, returning to its initial value when the beam again views only the document, thereby providing a sequence of pulses, the number of which are stored in counter 24*b* during each character scan period. It may further be seen that other and different characteristics of the scanning operation could similarly be stored in counter 24*b*. By way of example such characteristics as the incremental amplitude and/or magnitude of the electrical waveform provided by the various light reflectivities viewed, as well as the time at which the changes in the light reflectivity occur could be accumulated. However, in order to keep this portion of the description of the invention as brief as possible, it will be assumed that the number of changes from the white, or document area, to the black, or character area, are stored in counter 24*a* only, the other characteristics developed by the scanning operation alternately being stored as desired.

Again for reasons of clarity, the output from each of the flip-flop stages of counter 24*b* are depicted as being coupled within a common cable to the input of correlation networks 40′, 42′, and 44′, it being understood that only certain combinations of the bi-valued output of each stage of counter 24*b* are applied to each individual correlation network, the number and particular ones of the flip-flop outputs being selected in accordance with the number of symbols to be recognized as well as the specific design of the correlation networks.

Referring now to FIG. 3*a*, there is shown again, by way of example, the character or symbol O, indicated by reference numeral 90, it being understood that the following discussion is also applicable to all other alphanumerical and special character symbols. Remembering now that the beam deflected spot of light provided by the cathode-ray-tube is effective to traverse the entire area which may be occupied by a character symbol, these traverses are numbered 1 through 8 in the figure, each scan number being applied to the deflection of the beam across the character as shown. It will be seen that during the first scan, scan No. 1, the beam continuously traverses the entire portion of character 90 as indicated in waveform 96 of FIG. 3*a*. Next during scan No. 2, the cathode-ray-tube, or flying spot scanner (FSS), light beam intercepts the character twice producing a pair of pulses from the photodetector as also shown in FIG. 3*a*. Similarly, scan number 7 develops a pair of relatively narrow pulses and scan number 8 develops a single relatively wide pulse as also shown in waveform 96. It will also be seen that scan numbers 3 through 6 each likewise develop a pair of narrow pulses, resulting in a total of 14 pulses serially being applied to counter 24*b* in the specific example now being described. It may be seen that after these 14 pulses have been accumulated in counter 24*b*, that predeones of flip-flop stages of the counter are switched to the first stable, or ON, state, and that all the other stages remain, or have been, reswitched to the second stable, or OFF, state. It is further contemplated by the invention that counter 24*b* itself may control the setting of timing generator. This may be accomplished by coupling the output of the lowest order stage of the counter to the input of an astable multivibrator having a time period slightly greater than the vertical scan time. Thus, each time a transition from white to black occurs, the astable multivibrator is switched to its astable state causing generator to remain reset. At the completion of a character scan the multivibrator returns to its stable state setting generator 36, and opening the various gates. In this manner, the gates remain closed during the time data is being accumulated.

Continuing, the parallel output leads, or tap positions, of the stages of counter 24*b* are combined in various combinations and coupled to the weighted resistors forming each of the correlation networks 40′, 42′, and 44′. Again it may be seen that only the correlation network which corresponds to the character being viewed will provide an extreme output signal level. For example, assuming that the character scanned is O, the first, third, and fourth flip-flop stages will be in the ON state, and the second and all higher order stages will be in the OFF state. Remembering now that each stage provides both a high level signal and a low level signal independent of its state, and assuming further that the low level signal appears on the ON output lead of those stages in the ON state and on the complementary output lead when a stage is in the OFF state, by coupling the ON output leads of stages numbered one, three, and four together with the complemenary output lead of stage two and any additional higher order stages to the correlation network indicative of the symbol O, a minimum output signal amplitude level will be derived therefrom. Further information on the operation of a counter-plurality of correlation networks combination is to be found in the above-referenced Hemstreet application.

Continuing, the various voltage levels provided by correlation networks 40′, 42′, and 44′ are again applied through individual isolation diodes 46′, 48′, and 50′ to comparison diodes 52′, 54′, and 56′ as will as to a first control input terminal of a respective one of null detection gates 62′, 64′, and 66′. In a manner similar to the embodiment of the invention illustrated in FIG. 2, the cathodes of all of the comparison diodes are clamped to the minimum negative voltage level applied to the anodes of these diodes, since the minimum voltage level is effectively the most positive voltage applied to the comparison diodes.

This clamped potential is delivered in parallel along a line 60′ to the second control input terminal of all the null detection gates. It should be understood that each of the null detection gates is effective to pass the voltage coupled to the input signal terminal to the output signal terminal when the voltage levels applied to the first and second control terminals differ, but isolate the output terminal from the input terminal when the voltage levels applied to the control terminals do not differ as subsequently described in detail. It may again be seen that only one null detection gate provides this isolation function, that being the one associated with the correlation network providing the minimum negative voltage level.

The embodiment illustrated in FIG. 3 further differs from that illustrated in FIG. 2 in that no separate source of negative potential $-E_2$ is required. Rather the clamped output voltage is applied to a high gain amplifier 76, the output of which is coupled to gate 80′ along a line 78. In this manner, gate 80′, under control of timing generator 36, selectively delivers, along line 32, a high level negative voltage to the signal input terminals of null detection gates 62′, 64′, and 66′. It may be seen that amplifier 76 is not required to provide a constant or fixed gain, it being sufficient that the negative signal provided thereby exceeds a threshold level determined both by the magnitude of the voltages provided by the correlation networks included in those character channels which do not correspond with the character being scanned, as well as the degree of simplification considered necessary in the following recognition circuitry.

The output signals from all of the correlation networks, one being unmodified and the rest being drastically modified by the amplified output provided by amplifier 76, are individually coupled through channel gates 82′, 84′, and 86′ to the parallel input terminals of a utilization device 88′, which may be the same as utilization device 88.

Note should be made of the fact that although the embodiment of the invention shown in FIG. 3 has been specifically described with respect to converting character or other symbol patterns imprinted on a document into machine intelligible language, the various blocks and circuit elements illustrated therein may readily be substituted for the corresponding elements of the FIG. 2 embodiment. An important feature of this embodiment lies in the fact that defects in the symbol formation such as misformed or broken leading and trailing pattern edges, as well as misregistration of the character (provided only that the entire character area is scanned) does not effect character recognition accuracy. This feature results since each of these effects or "noise" are common to all of the correlation network output signals and the present invention responds only to the relative difference between the correlation signals rather than to the absolute correlation signal level itself.

Referring now to FIG. 4, there is illustrated a schematic diagram of a null detection network which forms the major portion of signal enhancer 30 indicated in FIG. 1. As thereshown, the output of a correlation network is coupled along line 68 to the input of a unity-gain inverter amplifier 100, the output of which is applied through a scaling resistor 102 to a summing junction 106. Additionally, the clamped potential provided by the group of comparison diodes is also delivered along line 60 through a separate summing resistor 104 to summing junction 106. Summing junction 106 is connected to the input terminal of summing amplifier 108, the output of which controls the operation of a gate 110. The input of gate 110 is coupled to the source of relatively large negative potential, either $-E_2$ or the output of amplifier 76. In operation, with equal potentials applied to lines 60 and 68, zero voltage appears at summing junction 106 as a result of the polarity inversion provided by unity-gain amplifier 100. At this time therefore, the output of summing amplifier 108 is also zero volts, causing gate 110 to remain closed, blocking the potential applied thereto along line 32. However, should the potential on line 68 become more negative than that on line 60, that is, the potential provided by a correlation network other than the one selected by the comparison diodes, a positive voltage appears at junction 106. This voltage, as amplified by summing amplifier 108, provides a negative signal to open gate 110. It will be seen that the gain of amplifier 108 may be made as large as reasonable to afford reasonable selection between the potentials on lines 60 and 68, since a feedback network consisting of diode 112 and resistor 114 is coupled between the output and input terminals of summing amplifier 108. Additionally, it is generally preferable that summing resistors 102 and 104 be adjustable to compensate for voltage drops across either the isolation or compensation diodes, or should inverter 100 exhibit other than unity gain.

What has been described is an improved character recognition apparatus which includes a novel signal enhancer device which aids in discrimination between the outputs provided by a plurality of correlation networks, there being one network for each character or symbol to be recognized. Data corresponding to the character is serially fed into a temporary storage device, and thereafter is read out therefrom in parallel form. By selectively combining individual elements of this data uniquely and coupling each combination to one of the plurality of correlation networks, the one network corresponding to the character provides a voltage that is an extreme, although one or more of the other networks may provide a voltage which differs therefrom by only a few millivolts. All of these voltages are fed to a diode logic circuit within the signal enchancer which selects the extreme voltage and then compares it with the output of all the networks. Since the compared voltages are equal for only one network, provision is included to drastically modify all the other voltages, thereby more accurate providing for selection of the proper correlation voltage in order to properly identify the character to be recognized.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

What is claimed is:

1. A character recognition apparatus comprising, a read station operable to provide an electrical signal representative of a pattern encoded on a document;

first means for moving said document past said read station to allow said read station to provide said electrical signal;

second means for temporarily storing said electrical signal provided by said read station, said second means operable to provide, in parallel, time samples of said electrical signal;

a plurality of third means, one for each of said character patterns to be recognized, individually operable to uniquely combine selected ones of said time samples to thereafter provide a plurality of output signals;

logic means responsive to all of said plurality of output signals for determining and selecting the one of said plurality of output signals that is an extreme;

a plurality of comparison networks, each having a first and second control terminal and an input and output terminal, said input terminal coupled to said output terminal only when the amplitude of the signals applied to said first and second control terminals are essentially different;

fourth means coupling the output signal provided by each of said plurality of third means to said first terminal of an associated one of said plurality of comparison networks;

fifth means coupling said extreme output signal to said second terminal of all of said plurality of comparison networks;

sixth means coupling a large amplitude signal to the input terminal of all of said plurality of comparison networks; means for modifying each of the output signals of said third means with an output from the output terminal of an associated one of said comparison networks; and a utilization device responsive to the output signals provided by said plurality of third means as modified by the output from said plurality of comparison networks for identifying said pattern moved past said read station by said first means.

2. The apparatus of claim 1 wherein said extreme output signal is a minimum negative potential.

3. The apparatus of claim 1 wherein said extreme output signal is a maximum positive potential.

4. The apparatus of claim 1 wherein said sixth means is operable to couple said large amplitude signal having the same polarity as said extreme output signal.

5. The apparatus of claim 1 wherein said sixth means is operable to couple said large amplitude signal having the opposite polarity as said extreme output signal.

6. A character recognition apparatus for identifying one of a predetermined group of indicia including a plurality of correlation networks, one for each of the indicia to be identified, comprising in combination, means for providing an electrical waveform representative of each indicia;

means for coupling unique selected portions of said waveform individually to said plurality of correlation networks, each of said networks providing an output signal proportional to the correlation of said selected portions with the transfer characteristics of said network;

means for determining the one of said output signals which is a minimum;

means for comparing said minimum output signal with all of said output signals; and means responsive to said comparing means for modifying with a large amplitude signal all of said output signals which are different from said minimum output signal whereby said one of said predetermined group of indicia is identified by the unmodified one of said output signals.

7. The apparatus of claim 6 wherein said means for comparing comprises, gate means having input and output terminals and a control terminal operable to couple said input terminal to said output terminal only when a signal is applied to said control terminal;

amplifier means having input and output terminals;

first circuit means coupling said output terminal of said amplifier means to said control terminal of said gate means; and second circuit means coupling said minimum output signal to said input terminal of said amplifier means and said output signal through polarity reversing means to said input terminal of said amplifier means in parallel.

8. The apparatus of claim 7 further including, second amplifier means having input and output terminals; and third circuit means coupling said minimium output signal to said input terminal of said second amplifier means and said output terminal of said second amplifier means to said input terminal of said gate means.

9. A character recognition apparatus comprising in combination, a magnetic read head providing various voltage waveforms representative of magnetic character symbols being read;

a delay line including an input terminal and a plurality of spaced output terminals;

means connecting said various voltage waveforms to said input terminal of said delay line;

a plurality of correlation networks, one assigned to each of said magnetic character symbols;

means coupling each of said networks to a selected plurality of said spaced output terminals such that for any character being read the signal appearing at the output of the network assigned to the character has a smaller signal value than the value of all the signals provided by the remaining networks; and signal enhancer means responsive to said smaller signal value for increasing the value of all the signals provided by said remaining networks.

10. The apparatus of claim 9 wherein said signal enhancer means comprises, logic circuit means having a plurality of input terminals and an output terminal;

first circuit means connecting each of the signals appearing at the output of the networks individually to one of said plurality of input terminals of said logic circuit means, said logic circuit means effective to select and provide at its ontput terminal only said smaller signal value;

a plurality of null detector gates, one assigned to each of said correlation networks, having an input, an output, and a pair of control terminals operable to couple said input terminal to said output terminal when the signal values applied to said first and second control terminals differ;

second circuit means coupling the output signal value of each network to said first control terminal of the null detector gate assigned thereto and said selected smaller signal value to said second control terminal of all of said plurality of null detector gates; and amplifier means having an input coupled to said selected smaller signal value and an output connected to said input terminal of all of said null detection gates; and third circuit means connecting said output terminal of each of said null detection gates to the output of the correlation network to which it is assigned.

11. A character recognition apparatus comprising in combination, means for viewing a character to be recognized and providing an electrical waveform representative thereof;

means for storing said electrical waveform including a plurality of parallel output terminals each providing a predetermined characteristics signal derived from said waveform;

a plurality of network channels, one for each characte to be recognized, having a selected transfer functior determined by a unique character;

means coupling each of said channels to a unique com bination of said plurality of parallel output termi nals to provide a plurality of output signals wherei the network having a transfer function determine by the character being viewed is smaller in absolut amplitude than all of the other output signals; an a plurality of comparator devices, one for each char nel, each responsive to the channel output signal an the output signal of smaller absolute amplitude fc increasing the absolute amplitude of said outpu signal upon sensing a difference between the signa to which it responds.

12. The apparatus of claim 11 including a utilizatic device having a plurality of input terminals and operab in response to signals within a predetermined range; ar said output signals of increased absolute amplitude lyi without said range.

13. A character recognition apparatus, comprising combination a transducer responsive to characteristics of the ch acter to be recognized and having an output sig having a waveform which is indicative of said ch acteristics, a plurality of correlation networks each having an o put signal proportional to the correlation of the o put signal of said transducer with the transfer ch acteristics of said network, means for selecting the output signal of one of s correlation networks which is of the smallest valu comparison to the value of the other output sig of the other of said correlation networks, a plurality of null detectors each associated with a spective one of said correlation networks and res sive to the output signal of the associated correla network and the selected output signal of said one correlation network, each of said null detectors including means for changing the value of the output signal of the assocated correlation network to a level which is outside a predetermined range whenever a difference exists between the value of the output signal of the associated correlation network and the value of the selected output signal of said one correlation network, and mean for detecting said output signals as modified by associated ones of said null detectors which are within said predetermined range.

References Cited

UNITED STATES PATENTS 3,212,058 10/1965 Sanner ----------- 340—146.3

MAYNARD R. WILBUR, *Primary Examiner.*

J. SHERIDAN, *Assistant Examiner.*